(No Model.)
J. P. LYNOTT.
CHURN.
No. 446,948. Patented Feb. 24, 1891.
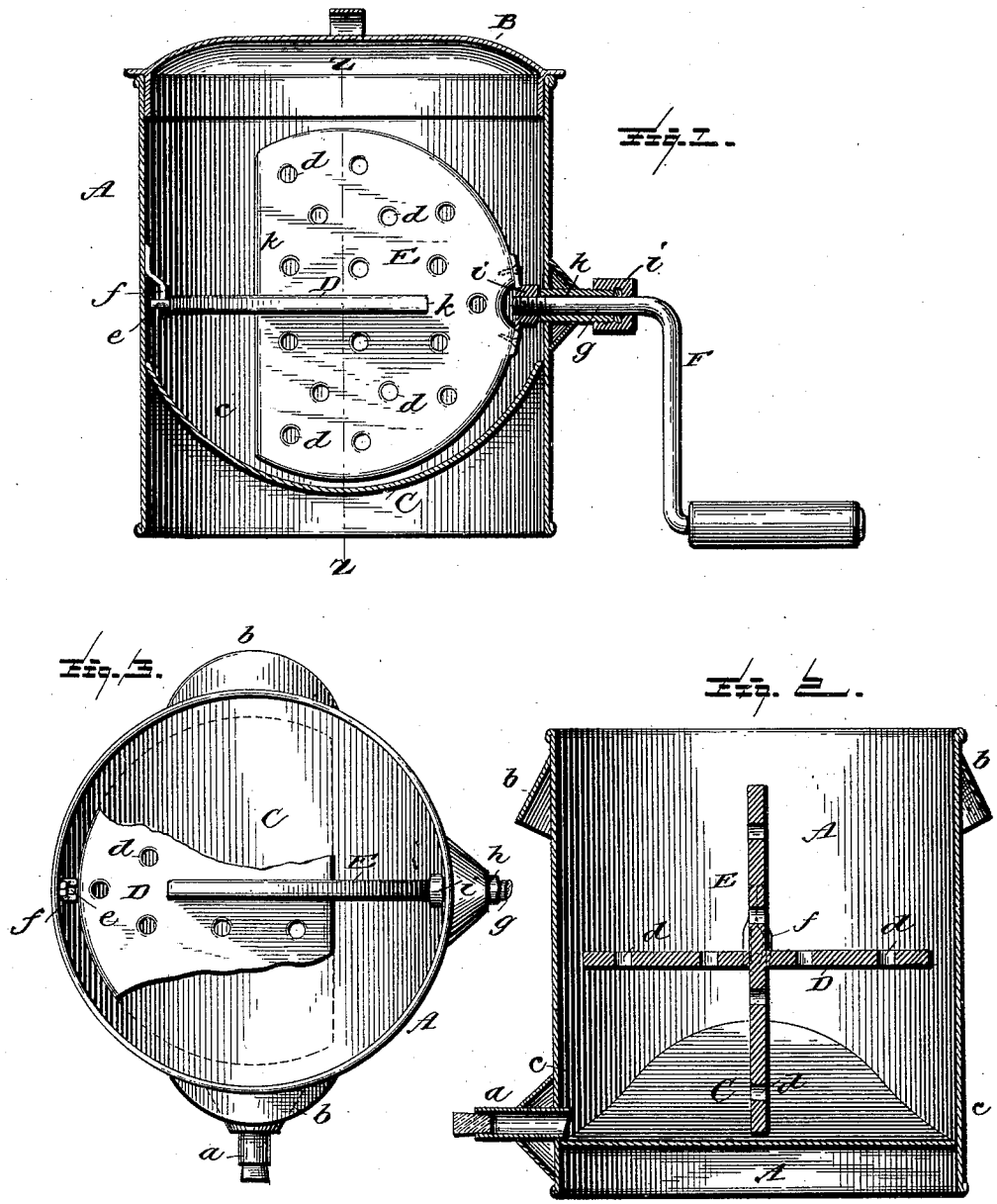
Witnesses
L. C. Hills.
G. M. Copenhaver.
Inventor
John P. Lynott,
per Chas. H. Fowler
Attorney

UNITED STATES PATENT OFFICE.

JOHN P. LYNOTT, OF LOUISIANA, MISSOURI.

CHURN.

SPECIFICATION forming part of Letters Patent No. 446,948, dated February 24, 1891.

Application filed August 22, 1890. Serial No. 362,766. (No model.)

*To all whom it may concern:*

Be it known that I, JOHN P. LYNOTT, a citizen of the United States, residing at Louisiana, in the county of Pike and State of Missouri, have invented certain new and useful Improvements in Churns; and I do hereby declare that the following is a full, clear, and exact description of the same, reference being had to the annexed drawings, making a part of this specification, and to the letters of reference marked thereon.

Figure 1 of the drawings represents a sectional elevation of my improved churn, showing the dasher in elevation; Fig. 2, a vertical section taken on line $z\ z$ of Fig. 1, and Fig. 3 a top plan view showing the dasher partly broken away.

The present invention has reference to that class of churns in which the revolving dasher is constructed of two perforated circular disks disposed at right angles to each other and adapted to revolve within a cylinder having a dished bottom.

Previous to my invention it was usual to construct the dasher of two perforated disks which were circular in shape and each provided with an open slot extending from its periphery to about its center, whereby the two were secured together. The bottom of the churn-cylinder wherein this class of dashers were used was dish-shaped or semi-spherical; and the purpose of the present invention is to improve both the construction of the dasher and the bottom of the churn-cylinder, whereby a more perfect agitation of the cream is obtained and with less difficulty, which objects I attain by the construction substantially as shown in the drawings, and hereinafter described and claimed.

In the accompanying drawings, A represents the churn-cylinder, which may be constructed of any suitable size and of any material found desirable, and is provided with a suitable cover B, spout $a$ for drawing off the liquid contents after the completion of churning, and suitable handles $b$ upon the sides of the cylinder. The bottom of the churn-cylinder, in contradistinction to being dish-shaped or semi-spherical, is trough-shaped—that is to say, the concavity extends in one direction diametrically across the churn-cylinder, thereby having the interior sides of the cylinder form upright walls to the ends of the trough-shaped bottom C, as shown at $c$, Fig. 2, of the drawings. The dasher-blades D E are perforated, as shown at $d$, and are supported within the churn-cylinder by a pin $e$, extending from the periphery of the blade D, which rests upon a hanger $f$, secured to the interior wall of the cylinder, and which forms a bearing for said pin. The dasher-blade E has suitably secured to its periphery a screw-nut to receive the screw-threaded end of a crank-handle F of any preferred construction, the shank $g$ of the crank-handle being supported by the hollow bearing $h$ upon the exterior of the churn-cylinder and the screw-threaded extremity of the shank engaging with the nut $i$.

By the above means of supporting the dasher in the cylinder it enables it to be readily removed therefrom by simply turning the crank-handle in a reverse direction from that required for churning, which will disengage the screw-threaded end of the shank from the nut and admit the dasher being lifted out of the cylinder and removed, as may also the crank-handle.

The essential feature of my invention, in addition to the trough-shaped bottom hereinbefore described, resides in the shape of the dasher-blades. These dasher-blades, instead of describing a complete circle, are a segment thereof, about one-third of the circle being cut away, as shown in Fig. 1. This particular shape of dasher-blade has a material advantage over the complete circular blade, and, in connection with the trough-shaped bottom, provides means for more effectively agitating the cream. The difference in the shape of the bottom over the dish shape hereinbefore referred to presents greater resistance of the cream to the dasher and enables a very small quantity of cream to be churned as well as a large quantity. The upright walls $c$ at the ends of the trough-shaped bottom C, which would be absent were the bottom dish-shaped or semi-spherical, prevent the cream from following the dasher as the latter is rotated. The dasher-blades, being of a segment of a circle instead of a complete circle, present four breaks to the cream, as shown at $k$, thereby zigzagging the course of the cream and rendering the churning thereof more effective. The dasher-blades are slotted, so that they will fit into each other, and suitably fastened together, this being a common means of construction, and further description is deemed unnecessary.

It will be noticed that the arrangement of the dasher-blades with relation to each other is such as to have the straight or cut-away portions near the center of the churn-cylinder and the curved portions upon the outside to obtain the best possible results upon the cream. It will be further noticed that the dasher revolves transversely to the length of the trough to carry the cream against the vertical walls at the ends thereof. Both of these features above described render the cream more thoroughly and perfectly agitated, the trough-shaped bottom and the peculiar construction of dasher-blades coacting in attaining this end, and producing thereby a perfectly-operating churn.

Having now fully described my invention, what I claim as new, and desire to secure by Letters Patent, is—

In a churn, the cylinder thereof having a trough-shaped bottom C, whereby upright walls $c$ at the ends of the trough are presented to the cream when churning, in combination with the dasher adapted to revolve in a direction transversely to the length of the trough-shaped bottom, and consisting of two perforated segmental-shaped blades arranged at right angles to each other upon a horizontal shaft, with their curved portions upon the outside and the straight portions or edges upon the center of the churn-cylinder, whereby the cream is more thoroughly agitated, substantially as and for the purpose set forth.

In testimony that I claim the above I have hereunto subscribed my name in the presence of two witnesses.

JOHN P. LYNOTT.

Witnesses:
 OREGON BROWN,
 J. P. LYNOTT, Jr.